(12) United States Patent
Gross

(10) Patent No.: US 12,246,817 B2
(45) Date of Patent: Mar. 11, 2025

(54) THERMOPLASTIC COVER PANEL FOR A STRUCTURE IN AN INTERIOR SPACE OF AN AIRCRAFT

(71) Applicant: Airbus Operations GmbH, Hamburg (DE)

(72) Inventor: Claus-Peter Gross, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/336,914

(22) Filed: Jun. 16, 2023

(65) Prior Publication Data

US 2023/0406475 A1 Dec. 21, 2023

(30) Foreign Application Priority Data

Jun. 20, 2022 (EP) ..................................... 22179884

(51) Int. Cl.
*B64C 1/06* (2006.01)
*B64C 1/40* (2006.01)

(52) U.S. Cl.
CPC .............. *B64C 1/066* (2013.01); *B64C 1/403* (2013.01)

(58) Field of Classification Search
CPC .......... B29C 66/7392; B29C 66/73921; B64C 1/066; B64C 1/403; B64C 2001/0072
See application file for complete search history.

(56) References Cited

U.S. PATENT DOCUMENTS

| | | | | | |
|---|---|---|---|---|---|
| 5,397,080 | A | * | 3/1995 | Berg | B64C 1/1484 |
| | | | | | 169/48 |
| 5,462,786 | A | * | 10/1995 | Van Ert | B32B 27/12 |
| | | | | | 156/212 |
| 10,232,532 | B1 | * | 3/2019 | Prebil | B29C 66/721 |
| 2008/0266887 | A1 | * | 10/2008 | Wentland | B64D 47/02 |
| | | | | | 362/470 |
| 2009/0101756 | A1 | * | 4/2009 | Cacciaguerra | B64C 25/16 |
| | | | | | 244/119 |
| 2010/0285294 | A1 | * | 11/2010 | Crane | B32B 3/06 |
| | | | | | 428/223 |
| 2013/0122244 | A1 | * | 5/2013 | Patel | B29D 99/0021 |
| | | | | | 156/196 |
| 2017/0100910 | A1 | * | 4/2017 | Del Pinto | B29C 51/082 |
| 2017/0101169 | A1 | * | 4/2017 | Del Pinto | B29C 66/7392 |

(Continued)

FOREIGN PATENT DOCUMENTS

| | | |
|---|---|---|
| DE | 102014215661 A1 | 2/2016 |
| EP | 0279620 A2 | 8/1988 |

(Continued)

OTHER PUBLICATIONS

Extended European Search Report for EP22179884.6 mailed Dec. 5, 2022, 7 pages.

*Primary Examiner* — Joshua J Michener
*Assistant Examiner* — Cindi M Curry
(74) *Attorney, Agent, or Firm* — Nixon & Vanderhye P.C.

(57) ABSTRACT

A panel for covering a part of a structure in an interior space of an aircraft is disclosed including a main panel section having an interior side and an exterior side, and at least one attachment device coupled with the exterior side. The main panel section is exclusively made from a single thermoplastic material, and the at least one attachment device is adapted for attaching the panel to the respective interior structure.

19 Claims, 6 Drawing Sheets

(56) References Cited

U.S. PATENT DOCUMENTS

| | | | | |
|---|---|---|---|---|
| 2017/0137105 A1* | 5/2017 | Roth | ......................... | B64C 1/40 |
| 2017/0173864 A1* | 6/2017 | Linde | .................. | B29C 66/8432 |
| 2017/0225762 A1* | 8/2017 | Roth | ....................... | B64C 1/067 |
| 2020/0114595 A1* | 4/2020 | Juillen | ................. | B64D 27/402 |

FOREIGN PATENT DOCUMENTS

| | | | |
|---|---|---|---|
| EP | 2591909 | A2 | 5/2013 |
| EP | 3156215 | A1 | 4/2017 |
| EP | 3216690 | A1 | 9/2017 |
| WO | 2017112846 | A1 | 6/2017 |

* cited by examiner

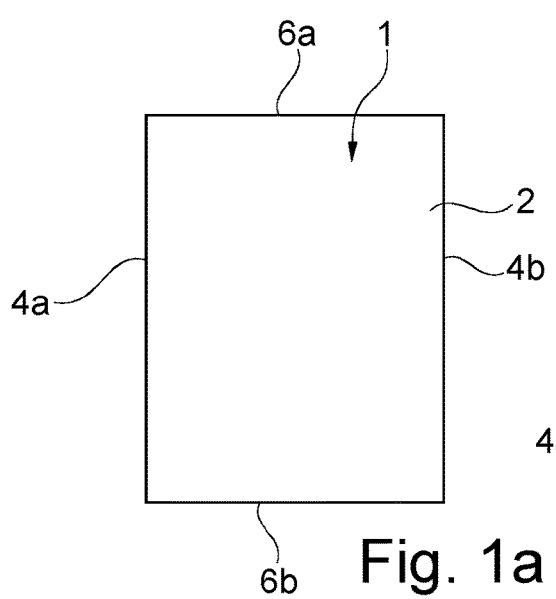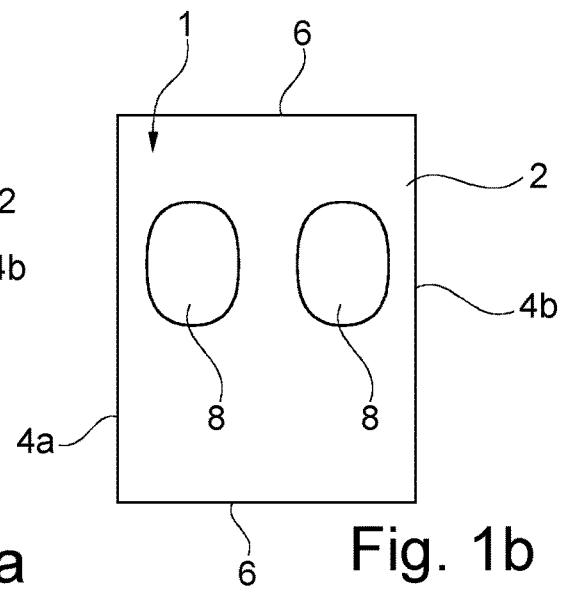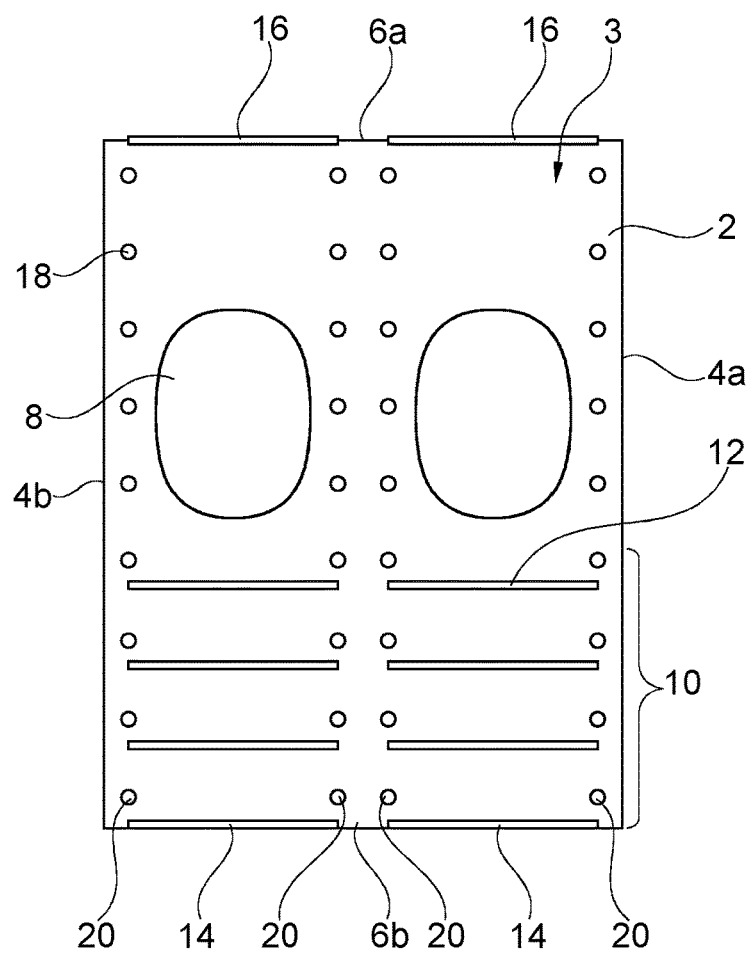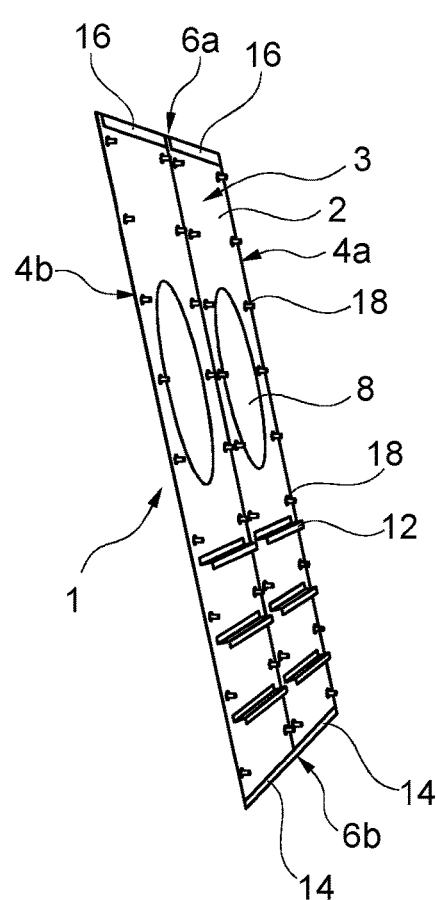

THERMOPLASTIC COVER PANEL FOR A STRUCTURE IN AN INTERIOR SPACE OF AN AIRCRAFT

CROSS REFERENCE TO RELATED APPLICATION

This application claims priority to and incorporates by reference the entirety of European Application Number EP 22179884.6, filed Jun. 20, 2022.

TECHNICAL FIELD

The invention relates to a panel for covering a part of a structure in an interior space of an aircraft, a method for producing such a panel as well as an aircraft having a structure as well as at least one such panel for covering a part of the structure.

BACKGROUND

Commercial and transport aircraft usually comprise a fuselage having a fuselage structure and an interior space created inside it. The interior space may be used for providing a cabin for passengers or as a freight compartment. For protecting equipment components running along structural parts, such as air ducts, insulation packets, electrical lines, and other, as well as to provide a pleasing appearance, the interior space is usually cladded with cover panels. For example, passenger cabins comprise side wall panels, ceiling panels, dado panels, and other to define cabin boundaries.

Due to a common requirement in designing aircraft components, these cover panels are commonly designed as lightweight components, which comprise a combination of various materials. For example, duromer material, fibers and coatings together provide easy-to-handle, lightweight and optically pleasing components. However, due to combining these varied materials, the cover panels may be hard to recycle. A full separation of these varied materials is hardly possible, such that the sustainability remains improvable.

SUMMARY

The invention contemplates a cover panel that comprising comparable mechanical properties as common cover panels, but is substantially completely recyclable.

According to an exemplary embodiment, a cover panel is disclosed having the features of independent claim 1. Advantageous embodiments and further improvements may be gathered from the subclaims and the following description.

A cover panel for covering a part of a fuselage structure in an interior space of an aircraft is proposed, the panel comprising a main panel section having an interior side and an exterior side, and at least one attachment device coupled with the exterior side, wherein the main panel section is exclusively made from a single thermoplastic material, and wherein the at least one attachment device is adapted for attaching the cover panel to the fuselage interior structure.

A gist of the invention lies in providing a cover panel for covering parts of the structure of the aircraft substantially in the same way as with common cover panels. However, a drastically improved recyclability is achieved by exclusively using a single thermoplastic material for the main panel section.

In this regard, the main panel section is to be understood as a part of the cover panel that substantially defines its size and contour depending on the intended installation position. For example, the cover panel may be a sidewall panel, a ceiling panel, a dado panel, or similar and the size and contour are dimensioned accordingly. While the interior side is intended for facing away from the respective structure, the exterior side is intended for facing the structure.

The term "exclusively made from a single thermoplastic material" relates to a material of the main panel section that comprises the thermoplastic material while being substantially free from any other material such as reinforcing fibers, e.g. the panel is free from carbon fibers or other reinforcing fibers. In an example, the material of the main panel section is free from any reinforcing fibers. As another example, the material does not comprise further integrated components or parts that are made from other material to allow an optimized recycling, which e.g. enables up to 100% reuse of the gained material. In an option, the main panel section is completely reusable with its thermoplastic material for manufacturing new main panel sections.

According to an exemplary embodiment, no additional layers are provided for increasing strength or stability of the main panel section; and only a cover layer may be provided for visual purposes.

According to an exemplary embodiment, additional layers are provided for increasing strength or stability of the main panel section, but they are mechanically removable. In an example, they can be peeled off from the main panel section.

In an example, the main panel section is free from any embedded supply installations like integrated wires or conduits made from other material than the thermoplastic material.

The attachment device to be coupled with the exterior side may comprise one or a plurality of brackets, pins, hooks, holes, recesses, or the like. The attachment device may be shaped complementary to a receiving device arranged on the structure to allow a form-fit engagement between the attachment device and the receiving device. It is conceivable, that the attachment device is mechanically connected to the main cover section. For example, it may be screwed or bolted to the exterior side or snapped into suitable snap connector elements. However, the attachment device may be made from the same thermoplastic material and may thus also be welded to the exterior side.

Using a thermoplastic material for providing the main panel section allows to recycle the main panel section completely, without producing any waste. Additional components, which may be added to the main panel section, may be designed to be completely removable or may be made from the same thermoplastic material. Thus, the panel according to the invention may be completely recyclable. Ideally, the thermoplastic material is translucent to apply preferably laser welding. However, this is not absolutely required.

It is conceivable, that the dimensional stability of the cover panel might be smaller than the dimensional stability of common cover panels. However, this may be compensated by using a plurality of suitable attachments devices distributed over the exterior side of the cover panel. Also, by using suitably designed edge regions to prevent indentation of the cover panel. In most, if not all, situations the cover panel does not need to be a load carrying device and the function for covering the structure is sufficiently achieved by the proposed monolithic design without stiffening fibers or other material combinations. All additional components that need to be attached to the main panel section that are made from other materials may be mechanically (removably) be attached to the main panel section.

Suitable thermoplastic materials may include PEEK (polyether ether ketone), PEKK (polyether ketone ketone), PA (polyamide), PPS (polyphenylene sulfide), PEI (polyetherimide), or the like. In particular when using PEEK and PEKK, the main panel section may comprise a sufficient dimensional stability with material thicknesses of less than 5 mm and in particular in the region of 4 mm, 3 mm or less.

According to an exemplary embodiment, the panel is a sidewall panel as a lateral delimitation of a cabin. A side wall panel usually extends from a cabin floor, or an upper edge of dado panel towards an overhead stowage compartment, or a ventilation outlet directly adjacent to it. The sidewall panel is usually curved to follow the curved shape of the structure of the fuselage. The attachment device may be adapted to couple the sidewall panel with frames and/or stringers of the structure. The sidewall panel may be adapted for holding insulation packets, in particular of a secondary insulation. It is to be understood that the cover panel according to the invention is not necessarily limited to covering only a single structural section between two consecutive frames, but may also extend over two, three or more such structural sections. It is conceivable that the cover panel is designed to rest on all flanges of circumferential frames of the respective structural section(s) and should therefore be adapted in size.

According to an exemplary embodiment, the main panel section is made from a substantially flat thermoplastic workpiece, wherein at least one stiffening element made from the same thermoplastic material is welded to the exterior side to enhance the dimensional stability of the panel. The workpiece may comprise a constant material thickness and may be cut to size prior to providing further installations. The stiffening elements may be longitudinal stiffening elements that may extend parallelly to at least one of the edges of the cover panel. If the cover panel is a sidewall panel, the stiffening elements may extend along the longitudinal axis of the aircraft in the installed state of the cover panel. A plurality of stiffening elements may be provided, which are arranged parallel and at a distance to each other. Stiffening elements may be similarly designed to stringers and may comprise a curved or angled cross-sectional surface. Welding may particularly be provided with ultrasonic or laser welding methods.

According to an exemplary embodiment, the substantially flat thermoplastic workpiece is thermo-bent to be curved before or after attaching the at least one stiffening element. The workpiece is thus heated to a temperature that is sufficient for conducting a plastic deformation, e.g. a glass transition temperature, wherein the thermo-bending may be conducted in or on a heated mold. For example, the workpiece is curved to conform the curvature of an interior side of the fuselage structure, if the cover panel is used as a side wall panel for the cabin.

According to an exemplary embodiment, the cover panel further comprises a window cutout and a window funnel attached to the exterior side. The window funnel may be made from the same thermoplastic material, e.g. through injection molding, and may be welded or overmolded to an edge region surrounding the window cutout on the exterior side. The window funnel provides a connection to an outer window mounted in the skin of the aircraft fuselage. It is to be understood that other common additional parts are provided for completing a cabin window arrangement, which include blinds, an interior window, fastening elements as well as covers for covering the fastening elements. The window cutout may be made through abrasive water jet cutting, milling or laser-based methods.

According to an exemplary embodiment, the cover panel further comprises a cover layer on the interior side. To provide a pleasant optical and/or haptical appearance, the interior side may be covered with a foil, which is peelable off prior to recycling the main panel section. Also, the application of color or coating, e.g. through a hydro dipping method, is conceivable. It is preferred if the cover layer is completely removable, particularly preferably mechanically and in one piece.

According to an exemplary embodiment, the cover panel further comprises a plurality of fasteners for attaching an insulation packet. The insulation packet, which may be a secondary insulation packet, may be attached to the exterior side of the cover panel. Fasteners, such as pins or the like, can be used for holding or clamping the insulation packet. Of course the fasteners may be welded to the exterior side of the cover panel if they are made by the same thermoplastic material. However, screwing is also possible. The insulation packet may be a compressible, dimensionally stable foam that is clampable to the cover panel.

According to an exemplary embodiment, the attachment device comprises brackets for fastening the panel to the structure. The brackets may be arranged in a lower section of the cover panel, but may also be arranged in a top section. It is conceivable to provide brackets that allow hooking the cover panel into complementary shaped receiving element, to attach the window funnel to a window arrangement in the fuselage structure. Further, an upper edge or an element arranged at the upper edge may be clamped into another, structurally fixed component.

According to an exemplary embodiment, the brackets are made from the same material as the main panel section. This allows the recycling with attached brackets.

According to an exemplary embodiment, the panel further comprises at least one sealing profile for engaging opposed edges of adjacent panels to seal a gap between the adjacent panels and to hold the edges relative to each other. The sealing element may extend along the edges of the cover panel that face edges of other cover panels. If the cover panel is a sidewall panel, this may refer to the lateral edges when looking directly onto the interior side of the cover panel. The sealing element further increases the stiffness of the arrangement of cover panels. Also, it provides for the function of tolerance compensation, as the appearance of the arrangement of two subsequent cover panels with the sealing element attached is harmonic even when the gap between the cover panels is irregular.

According to an exemplary embodiment, the at least one sealing profile is mechanically detachable from the main panel section. This allows a material-selected recycling process for the main panel section. In an option, also the sealing profile is supplied to a material recycling procedure.

According to an exemplary embodiment, all additional components added to the main panel section are either i) made from the same thermoplastic material, or are ii) mechanically completely removably attached to the main panel section when made from other materials. This allows an efficient and facilitated recycling procedure allowing the targeted use of the thermoplastic material. When providing mechanically completely removable additional components, e.g. as attachments to the main panel section, as an option it is provided to use a same second material for these additional components to also provide an efficient and facilitated recycling procedure allowing the targeted use for that second material. An example for the second material is a certain metal like aluminum for attachments means.

According to an exemplary embodiment, the cover panel can be de-installed or de-mounted with mounted attachments. The parts that are non-thermoplastic, i.e. which are not from thermoplastic material, can easily be removed in a mechanical way, such as removing an insulation packet, in order to the supply the at least partly stripped-off cover panel to a thermoplastic material recycling.

According to an exemplary embodiment, a method for producing a cover panel for covering a part of a fuselage structure in an interior space of an aircraft is disclosed, comprising the steps of providing a main panel section as a flat workpiece exclusively made from a single thermoplastic material having an interior side and an exterior side, and coupling at least one attachment device with the exterior side, wherein the at least one attachment device is adapted for attaching the cover panel to the respective fuselage structure.

According to an exemplary embodiment, the method further comprises welding at least one stiffening element made from the same thermoplastic material as the main panel section to the exterior side to enhance the dimensional stability of the cover panel.

According to an exemplary embodiment, the method further comprises thermo-bending the main panel section to be curved before or after attaching the at least one stiffening element.

It is to be understood that the method according to the invention may further comprise the steps of cutting a window cutout into the main panel section. It may further comprise the step of attaching, in particular welding of a window funnel to the exterior side of the main panel section. Still further, it may comprise the step of providing a cover layer on the interior side. Furthermore, it may comprise attaching, in particular welding, a plurality of fasteners to the exterior side for attaching an insulation packet. Also, the method may include the step of providing at least one sealing profile for engaging opposed edges of adjacent cover panels to seal a gap between the adjacent cover panels and to hold the edges relative to each other.

The invention further relates to an aircraft, comprising a fuselage having a fuselage structure and an interior space created therein, wherein at least one panel according to the above is arranged in the interior space to cover at least a part of the fuselage structure.

According to an exemplary embodiment, the cover panel is a sidewall panel, which spans over a plurality of windows, e.g. 2, 3, 4, 5, 6 or more, arranged in the fuselage of the aircraft. However, it may be possible to dimension the sidewall panels in such a way that it only spans over a single window.

The invention also relates to the use of exclusively a single thermoplastic material to manufacture at least a main panel section of a cover panel for covering a part of a fuselage structure in an interior space of an aircraft.

BRIEF DESCRIPTION OF THE DRAWINGS

For an understanding of embodiments of the disclosure, reference is now made to the following description taken in conjunction with the accompanying drawings. The drawings are schematic and not to scale. Identical reference numerals refer to identical or similar elements. They show:

FIGS. 1a to 7b illustrate subsequent steps and states of producing a cover panel based on a flat workpiece made from a single thermoplastic material as a starting point into a cover panel in form of a sidewall panel in different illustrations.

DETAILED DESCRIPTION

Figure 2A:
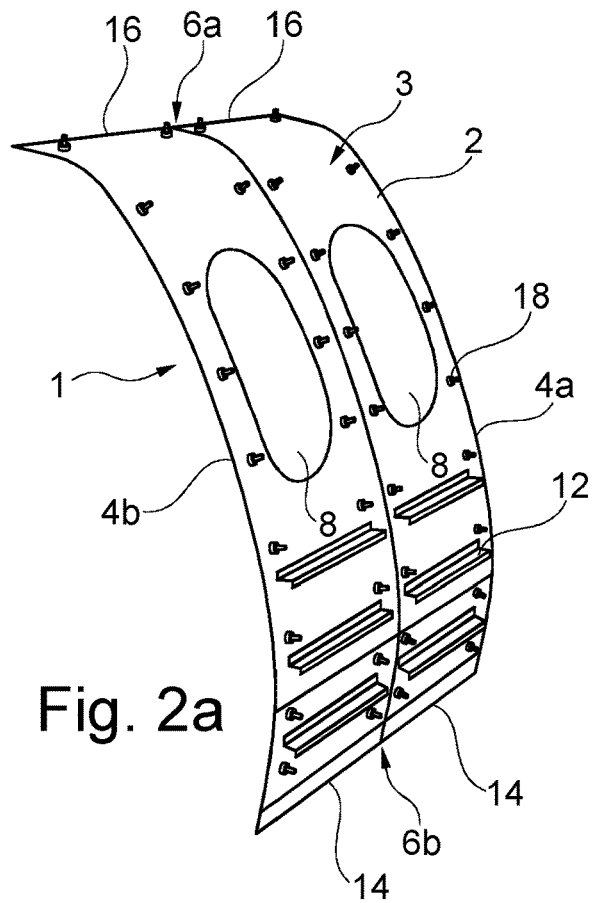

Some embodiments will now be described with reference to the Figures.

FIG. 1a shows a main panel section 2 in form of a workpiece 2, which is made from a thermoplastic material such as PEEK or PEKK, at the beginning of the manufacturing process for the cover panel. Here, the main panel section 2 is substantially flat and comprises a pair of two opposed lateral edges 4a and 4b as well as a pair of two opposed front edges 6a and 6b. These kind of workpieces may be provided by a manufacturer in form of a sheet-like material spool or a stack of sheets. They may be cut to size as required before conducting additional manufacturing steps. In FIG. 1a, an interior side 1 is shown.

In FIG. 1b, the main panel section 2 comprises two window cutouts 8, which may be provided by abrasive water jet cutting, milling or laser-based methods. In this exemplary embodiment, the cover panel to be manufactured is a sidewall panel that extends over two spaces between two frames, wherein exemplarily each space between two frames comprises a windows. The cover panel illustrated herein will be associated with two windows and thus comprises two window cutouts 8. However, other variants and other dimensions are conceivable. In particular, it is conceivable that spaces between two frames do not comprise a window, but may comprise other components, such as riser ducts for an environmental control system, or the like. In smaller aircraft, such as regional aircraft, consecutive spaces between frames sometimes are provided with a window and without a window in an alternating manner. Thus, the number and arrangement of window cutouts 8 is chosen to consider the exact design of the aircraft.

Further, as shown in FIG. 1c, a lower section 10 of an exterior side 3 of the main panel section 2 is equipped with a plurality of stiffening elements 12, which are made from the same thermoplastic material, as the workpiece 2. They are welded onto the exterior side 3 and may be arranged parallel to each other as well as to the lower front edge 6b. In an installed state of the cover panel, the lower section 10 of the cover panel will be arranged underneath cabin windows and may experience mechanical impacts from passengers and baggage. Thus, to avoid excessive indentation of the cover panel, the stiffening elements 12 are provided. Here, two consecutive groups of stiffening elements are provided, which are arranged to enclose a vertical gap that allows a placement of the cover panel onto a frame between the two windows associated with the respective cover panel.

In addition, the lower front edge 6b is equipped with lower edge protection profiles 14 to prevent damaging the lower front edge 6b. At the opposed upper front edge 6a, upper edge protection profiles 16 are provided. Several fasteners 18 are distributed over the exterior side 3 and are capable of holding an insulation package, which is not shown in this illustration. In the lower section 10, attachment devices 20 are provided, which are designed to engage with complimentary-shaped receiving devices at a fuselage structure.

FIG. 1d shows the main panel section 2 in this state in a three-dimensional view to further illustrate the attached parts. Here, it is apparent that the fastener 18 and the stiffening profiles 12 protrude away from the main panel section 2. Exemplarily, the stiffening profiles 12 comprise an S-shaped cross-sectional surface to provide a sufficient geometrical moment of inertia. It is to be understood, that other cross-sectional surfaces are also possible and this illustration does not limit the invention.

Figure 2B:
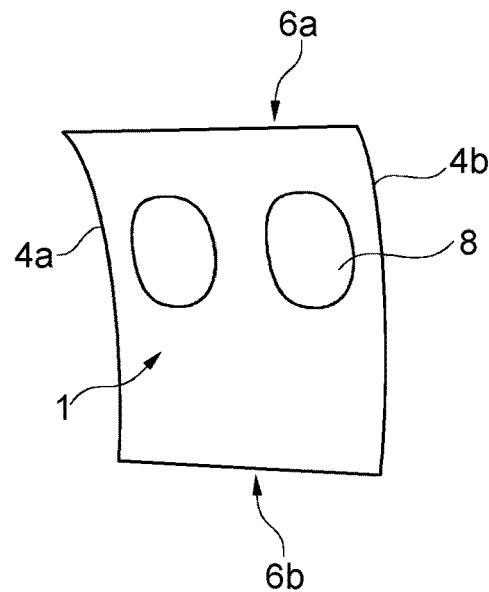

In FIG. 2a, the workpiece 2 is further processed by a thermal-bending process. It is heated to a glass transition temperature of exemplarily 140° C. to 180° C. in the case of PEEK or PEKK as the base material. Afterwards, the main panel section 2 has a distinctly curved shape, which conforms the shape of a commonly curved structure inside the aircraft. In FIG. 2b, the curved main panel section 2 is shown from the interior side.

Figure 3A:
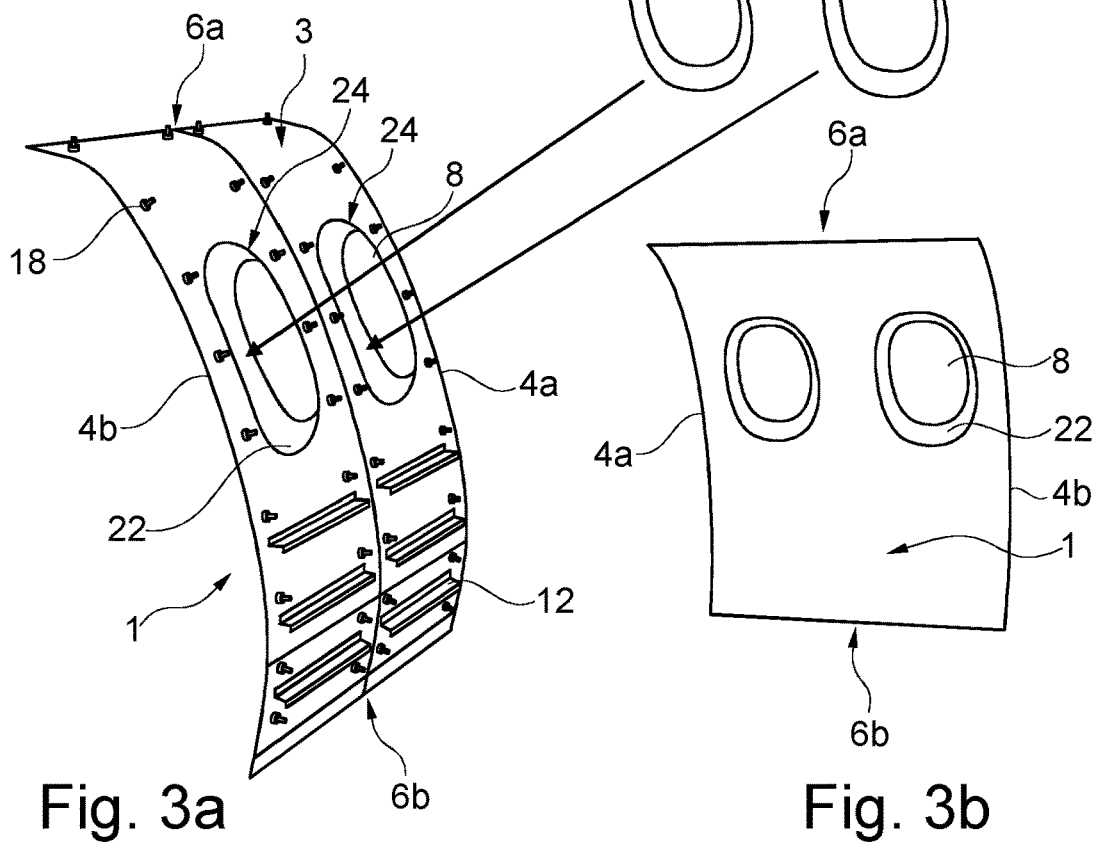
Figure 3B:
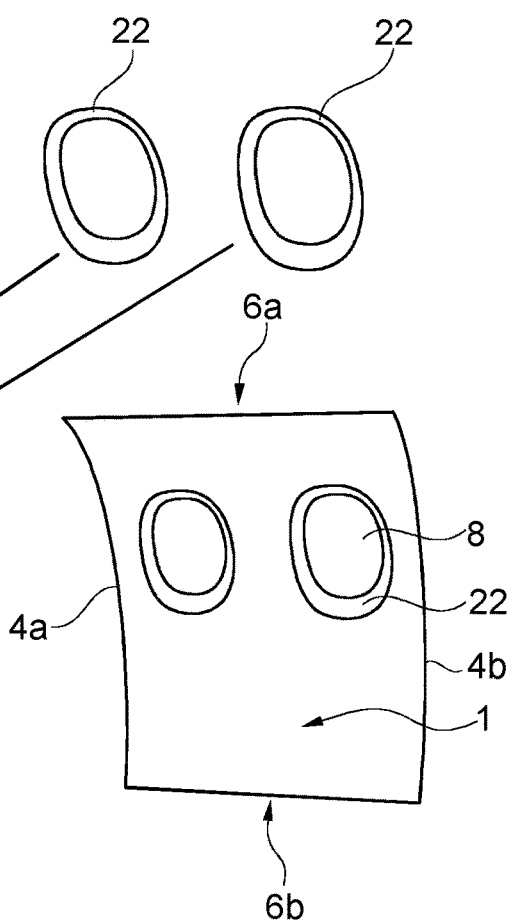

FIGS. 3a and 3b show additional window funnels 22 being attached to the window cutout 8. The windows funnels 22 may be made by the same thermoplastic material as the main panel section 2. They are welded to two edge regions 24 around the window cutouts 8.

Figure 4:
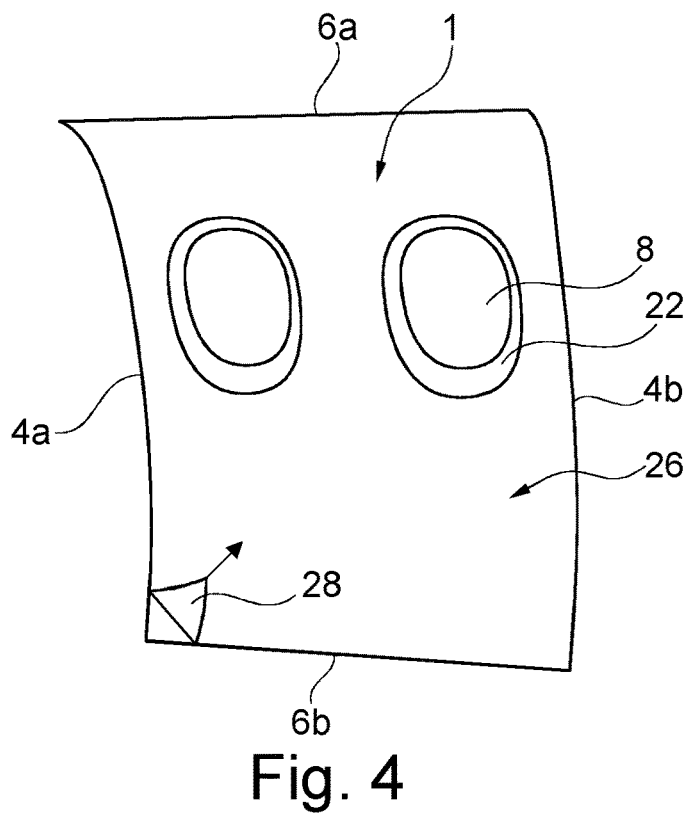

FIG. 4 shows a cover layer 26 attached to the interior side 1 of the main panel section 2. This may be a cover foil having a desired texture and color. It may be designed to be peeled off for recycling, as indicated by a corner 28 of the cover layer 26 at the beginning of being peeled off in this illustration.

Figure 5A:
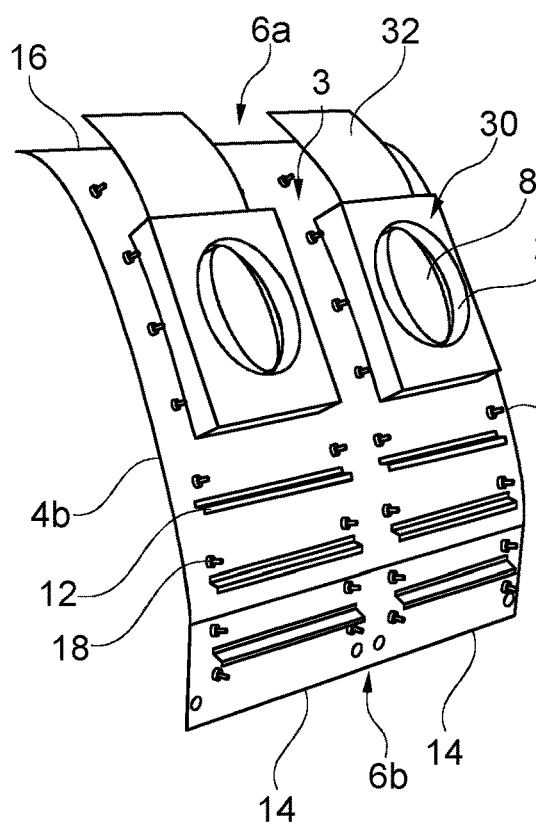

For further completion, window parts 30 are attached to the exterior side 3 of the main panel section 2 as shown in FIG. 5a. They include blinds 32 that are movable in front of and away from the window funnel 22. These may be designed to be removable from the main cover section 2 for recycling. However, they may also be made of the same material as the main panel section 2.

Figure 5B:
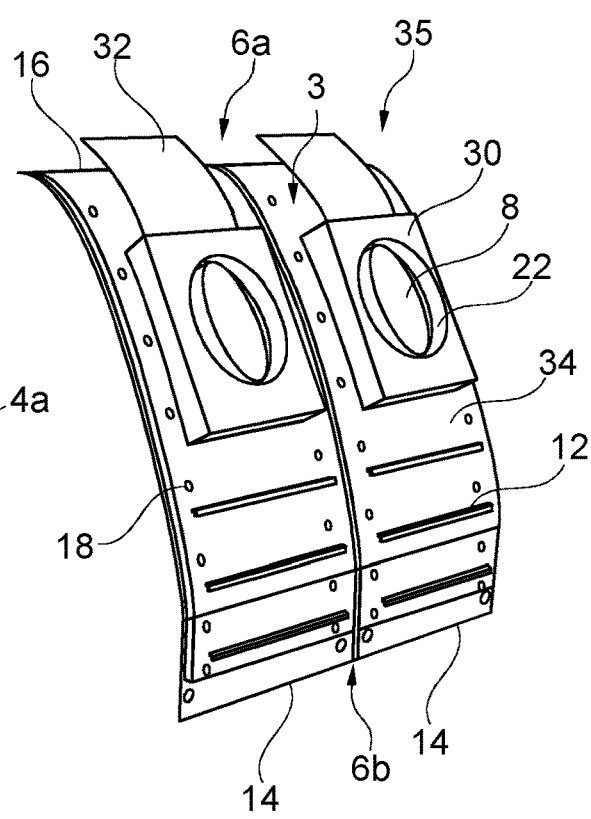

Lastly, insulation packets 34 are installed at the exterior side 3 as shown in FIG. 5b and held by the fasteners 18. In this state, the arrangement shown in FIG. 5b represents a substantially complete cover panel 35.

Figure 6A:
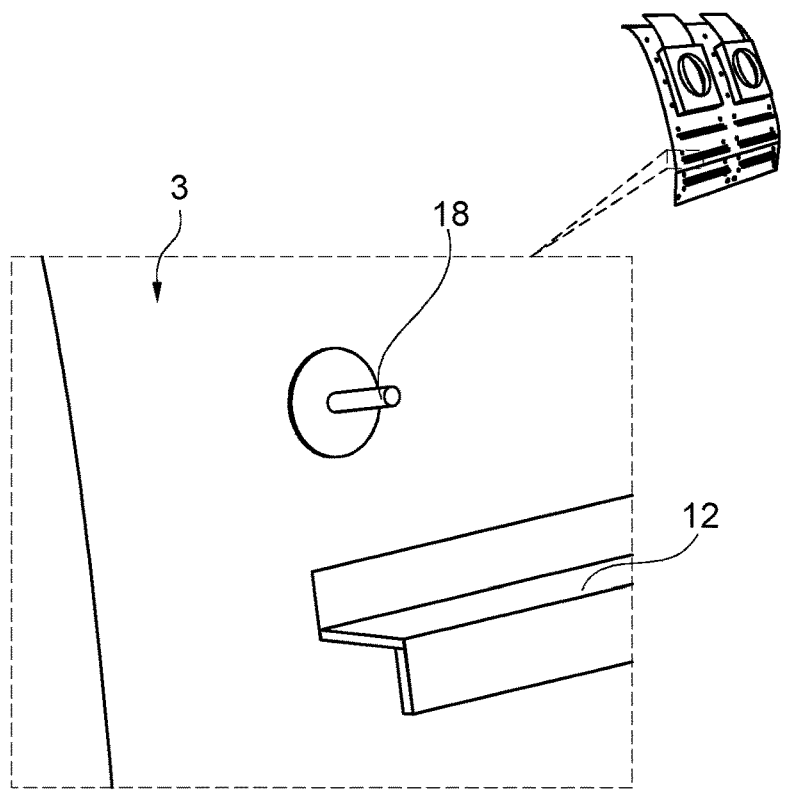
Figure 6B:
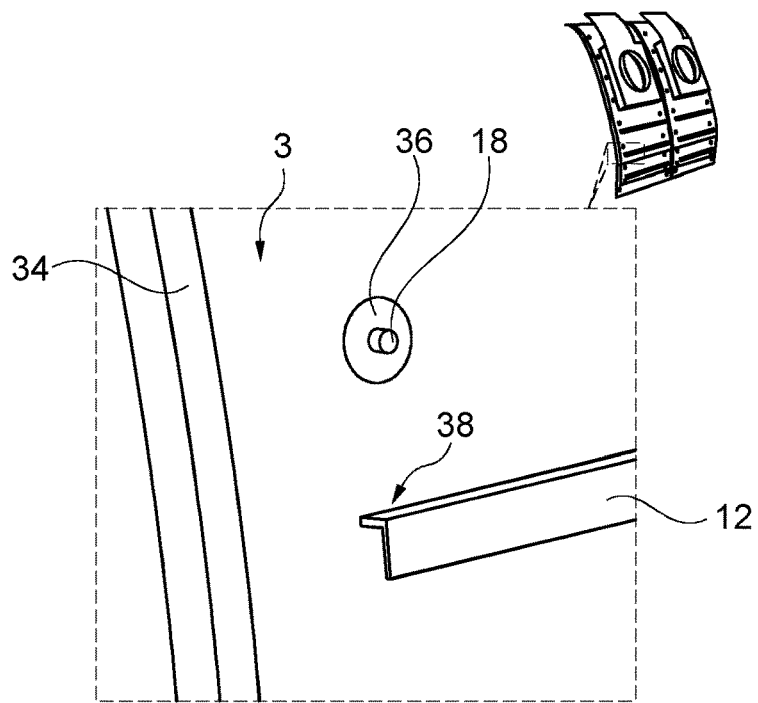

As shown in FIG. 6a, the fasteners 18 may comprise a pin, onto which the insulation packets 34 can be pressed, such that the pin protrudes through the insulation packet 34. A securing washer 36 is snapped onto the pin and thus secures the insulation packet 34 to the fastener 18.

The insulation packet 34 comprises cutouts 38 to let the stiffening elements 12 protrude through the insulation packet 34. The extension of the stiffening elements 12 in an outwards direction from the exterior side 3 may conform the material thickness of the insulation packet 34 to provide a harmonic, even surface on the back of the cover panel 35.

Figure 7A:
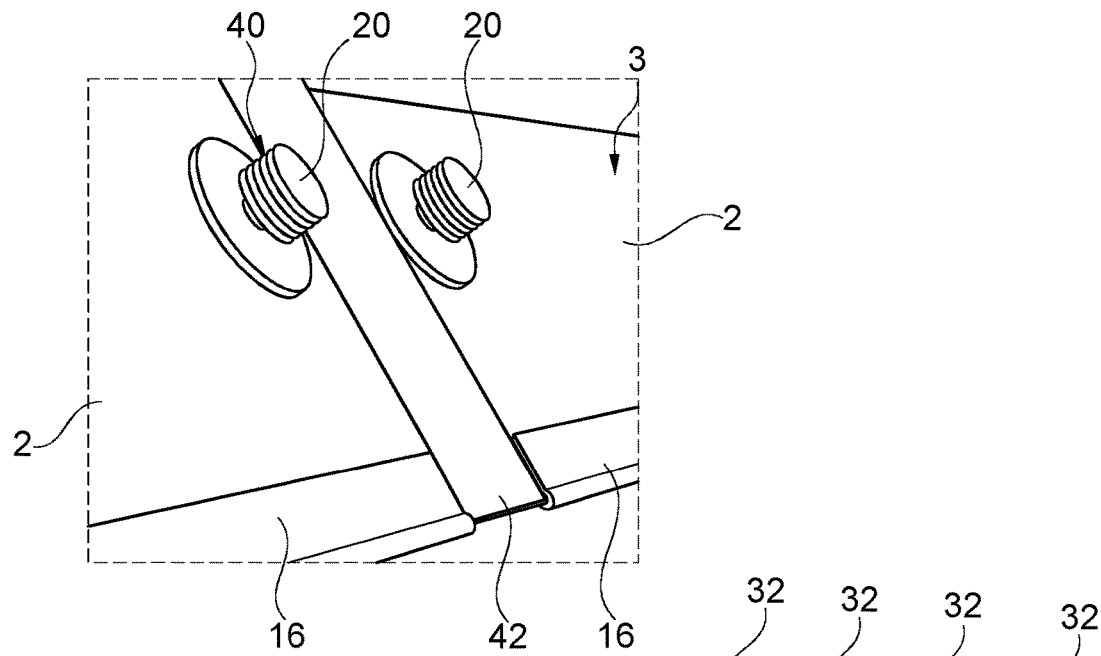

FIG. 7a shows the attachment devices 20 of two adjacent cover panels 35 in an exemplary embodiment. Here, the attachment devices 20 are designed to be pressed onto a complimentary formed receiving element (not shown) that is capable of snapping into the attachment devices 20, e.g. into circumferential recesses 40.

Figure 7B:
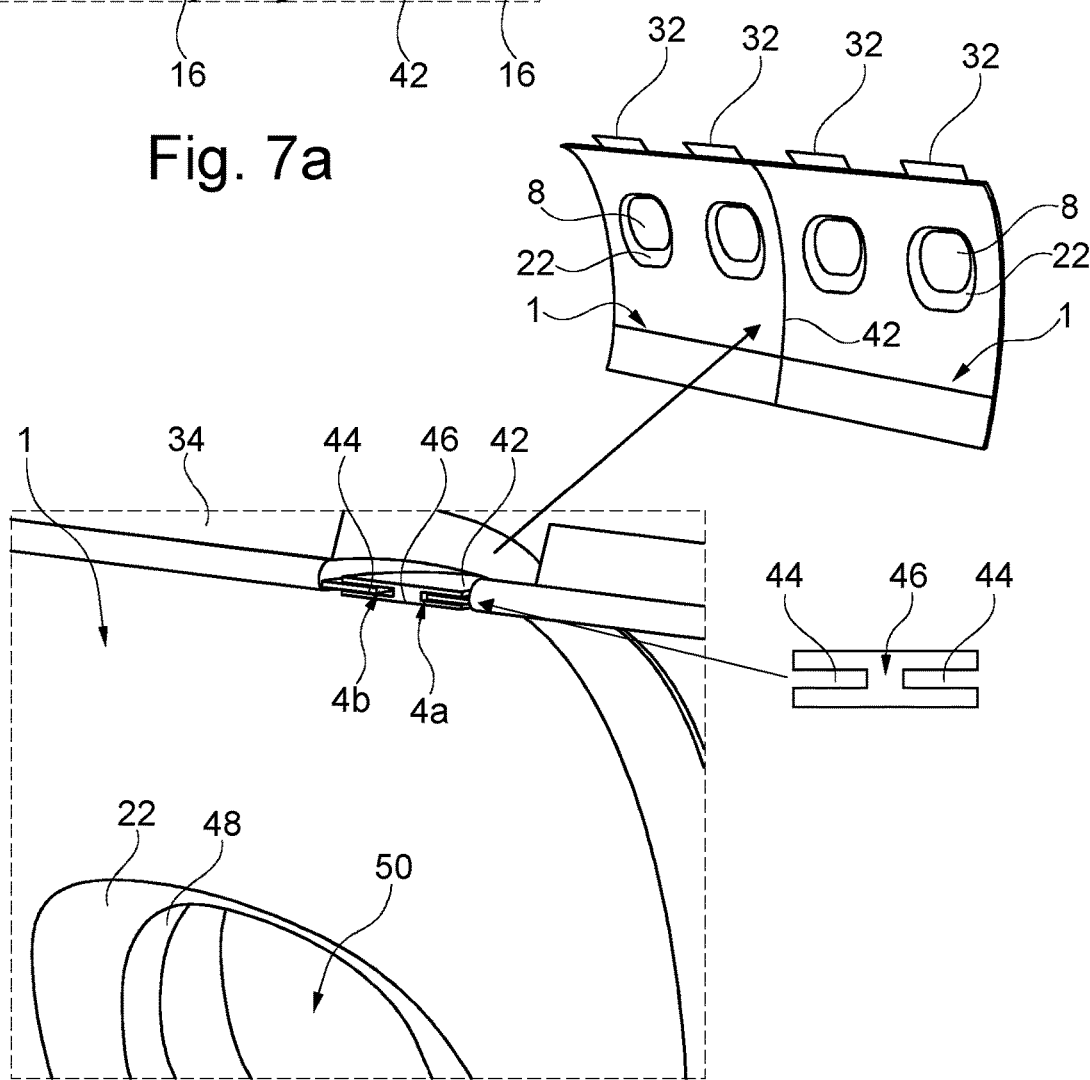

Between the two consecutive cover panels 35, a sealing profile 42 is provided, which is shown in further detail in FIG. 7b. Here, the sealing profile is mainly flat and substantially extends along the lateral edges 4a, 4b of the cover panels 35. It comprises two opposite lateral recesses 44 that are separated by a central web 46. Both adjacent cover panels 35 are inserted into the recesses 44 and are separated by the web 46. Thus, the cover panels 35 hold each other through the constraint by the sealing element 42. An impact or a local pressing onto one of the cover panels 35 does not lead to the creation of a gap between the lateral edges 4a and 4b, in which objects can be inserted and/or squeezed.

In this view, an interior window pane 50 is visible, which is attached to the window funnel 22. The window funnel 22 itself may be connected to an exterior window arranged in the fuselage structure, e.g. by a set of screws (not shown) radially extending through a respective window frame into the window funnel 22. A cover ring 48 is snapped into the window funnel 22 onto the respective window frame to cover the screws. The cover panel 35 is thus also held at the exterior window frame. This arrangement can be completely disassembled to improve the recyclability.

As shown and explained above, the set-up of the inventive cover panel provides an approach that is based on a recycling targeting on material-specific separation. The option of providing all add-ons to the main cover panel section to be either of the same material or to be easily removable, results in a facilitated dismantling procedure and allows to provide material-separated recycling steps.

Figure 8:
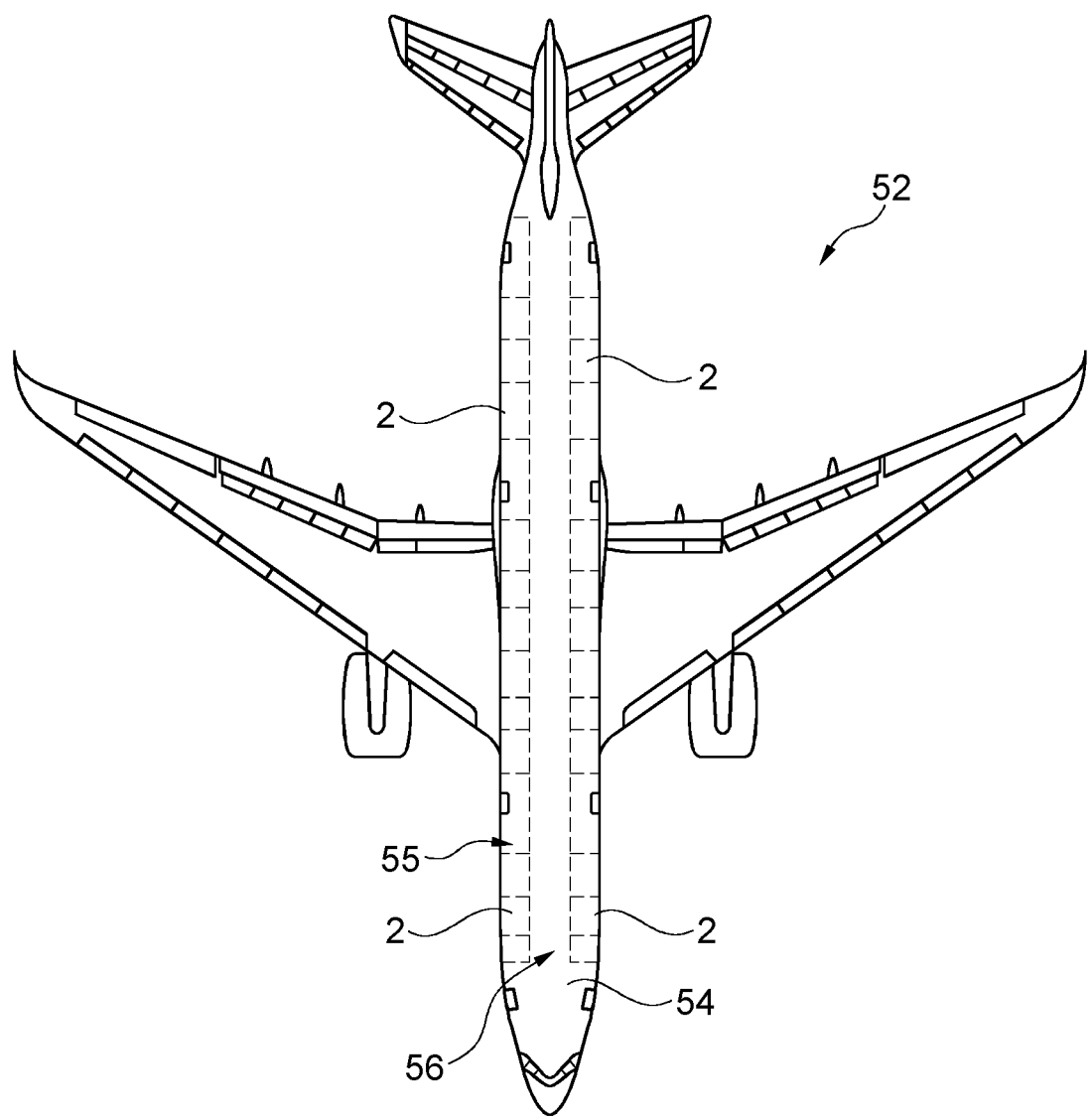
FIG. 8 illustrates an aircraft.

Lastly, FIG. 8 shows an aircraft 52 having a fuselage 54 with a fuselage structure 55, in which an interior space 56 is created. A series of cover panels 24 is provided. However, besides using the cover panels 35 in the form of sidewall panels, also ceiling panels, dado panels and other cover panels can be integrated into the interior space 56.

The invention claimed is:

1. A cover panel for covering a part of a fuselage structure in an interior space of an aircraft, the cover panel comprising:
   a main panel section having an interior side and an exterior side, and
   at least one attachment device coupled with the exterior side,
   wherein the main panel section is exclusively made from a single thermoplastic material;
   wherein the at least one attachment device is adapted for attaching the cover panel to the respective fuselage structure; and,
   wherein additional components added to the main panel section, comprising the at least one attachment device, are made from the same thermoplastic material as the main panel section.

2. The cover panel of claim 1, wherein the cover panel is a sidewall panel as a lateral delimitation of a cabin.

3. The cover panel of claim 1, wherein the main panel section is made from a substantially flat thermoplastic workpiece, and
   wherein at least one stiffening element made from the same thermoplastic material is welded to the exterior side to enhance the dimensional stability of the cover panel.

4. The cover panel of claim 3, wherein the substantially flat thermoplastic workpiece is thermo-bent to be curved before or after attaching the at least one stiffening element.

5. The cover panel of claim 1, further comprising a window cutout and a window funnel attached to the exterior side.

6. The cover panel of claim 5, wherein the window funnel is made from the same thermoplastic material as the main panel section.

7. The cover panel of claim 1, further comprising a cover layer on the interior side.

8. The cover panel of claim 7, wherein the cover layer is completely removable prior to recycling the main panel section.

9. The cover panel of claim 1, further comprising a plurality of fasteners for attaching an insulation packet.

10. The cover panel of claim 9, wherein the plurality of fasteners is made from the same thermoplastic material as the main panel section.

11. The cover panel of claim 1, wherein the attachment device comprising a plurality of brackets for fastening the panel to the fuselage structure.

12. The cover panel of claim 11, wherein each of the plurality of brackets for fastening the panel to the fuselage structure is made from the same thermoplastic material as the main panel section.

13. The cover panel of claim 1, further comprising at least one sealing profile for engaging opposed edges of adjacent cover panels to seal a gap between the adjacent cover panels and to hold the edges relative to each other.

14. A method for producing a cover panel for covering a part of a fuselage structure in an interior space of an aircraft, comprising:
providing a main panel section as a flat workpiece exclusively made from a single thermoplastic material having an interior side and an exterior side; and,
coupling at least one attachment device with the exterior side, wherein the at least one attachment device configured to attach the cover panel to the respective fuselage structure; and,
wherein additional components added to the main panel section, comprising the at least one attachment device, are made from the same thermoplastic material as the main panel section.

15. The method of claim 14, further comprising welding at least one stiffening element made from the same thermoplastic material as the main panel section to the exterior side to enhance the dimensional stability of the cover panel.

16. The method of claim 14, further comprising thermobending the main panel section to be curved before or after attaching the at least one stiffening element.

17. An aircraft, comprising a fuselage having a fuselage structure and an interior space created therein, wherein at least one cover panel of claim 1 is arranged in the interior space to cover at least a part of the fuselage structure.

18. The aircraft of claim 17, wherein the cover panel is a sidewall panel, which spans over a plurality of windows arranged in the fuselage of the aircraft.

19. A cover panel for covering a part of a fuselage structure in an interior space of an aircraft, the cover panel comprising:
main panel section having an interior side and an exterior side, and
at least one attachment device coupled with the exterior side,
wherein the main panel section is exclusively made from a single thermoplastic material;
wherein the at least one attachment device is adapted for attaching the cover panel to the respective fuselage structure; and,
wherein additional components added to the main panel section, comprising the at least one attachment device, are completely removably attached and are made from the same thermoplastic material as the main panel section.

* * * * *